(No Model.) 3 Sheets—Sheet 1.
L. A. SHATTUCK.
FOUNTAIN PEN.
No. 402,864. Patented May 7, 1889.
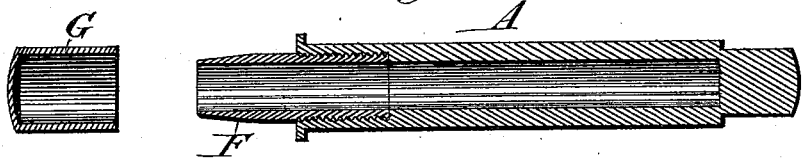
Fig. 1.
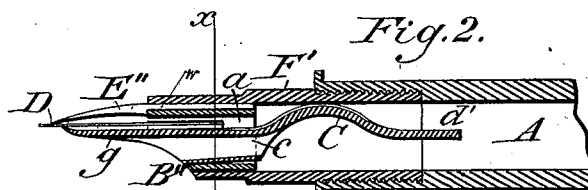 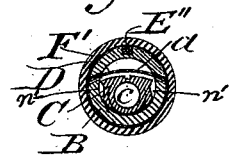
Fig. 2. Fig. 3.
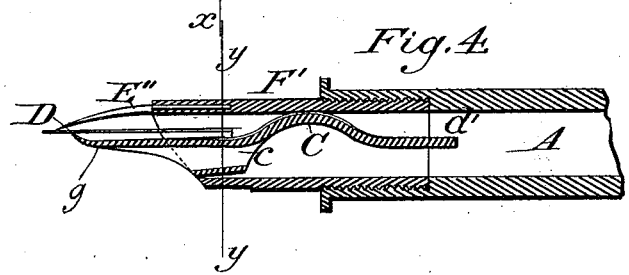 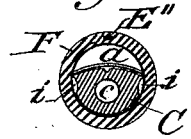
Fig. 4. Fig. 5.
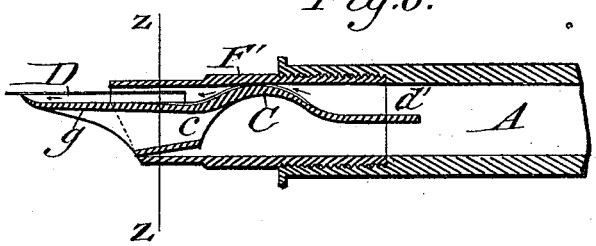 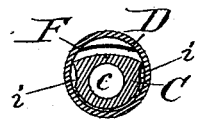
Fig. 6. Fig. 7.
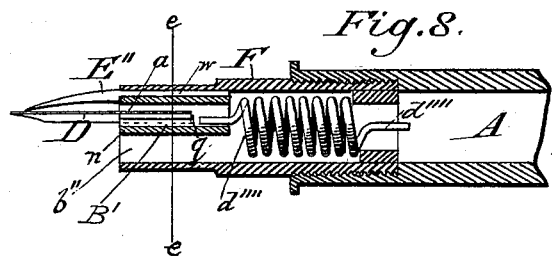 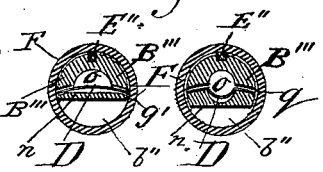
Fig. 8. Fig. 9.
Witnesses.
J. P. Theo. Lang.
Edward T. Fenwick
Inventor,
Lafresh A. Shattuck
By his Attorneys
Mason, Fenwick & Lawrence (No Model.) 3 Sheets—Sheet 2.
L. A. SHATTUCK.
FOUNTAIN PEN.
No. 402,864. Patented May 7, 1889.
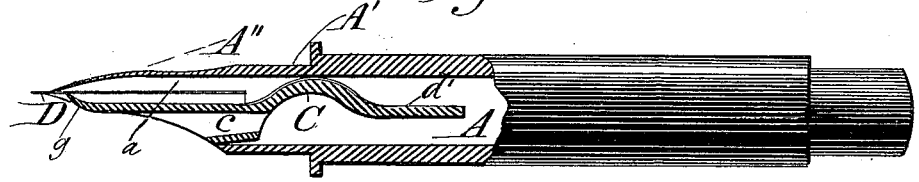
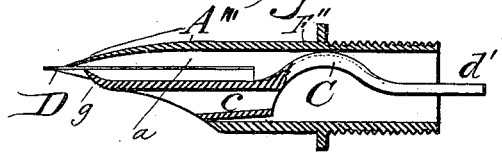 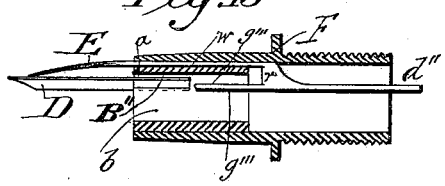
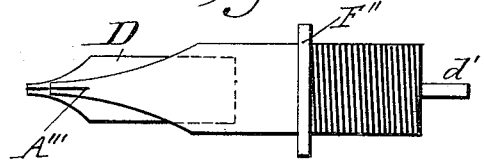 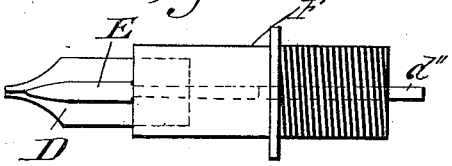
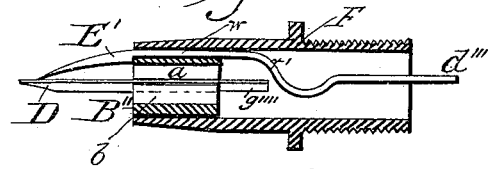 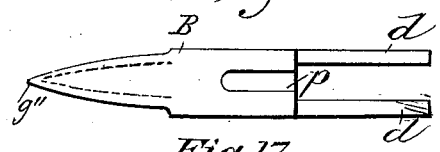
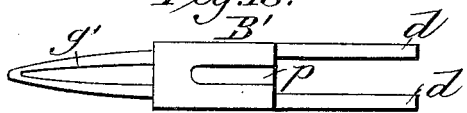 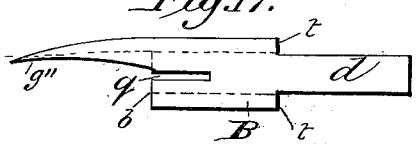
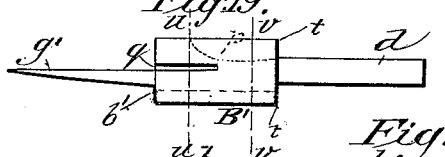 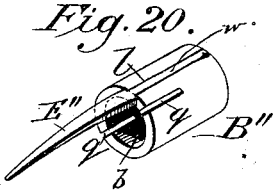
Witnesses.
J. P. Theo. Lang.
Edward T. Fenwick
Inventor.
Laforest A. Shattuck
By his Attorneys,
Mason, Fenwick & Lawrence

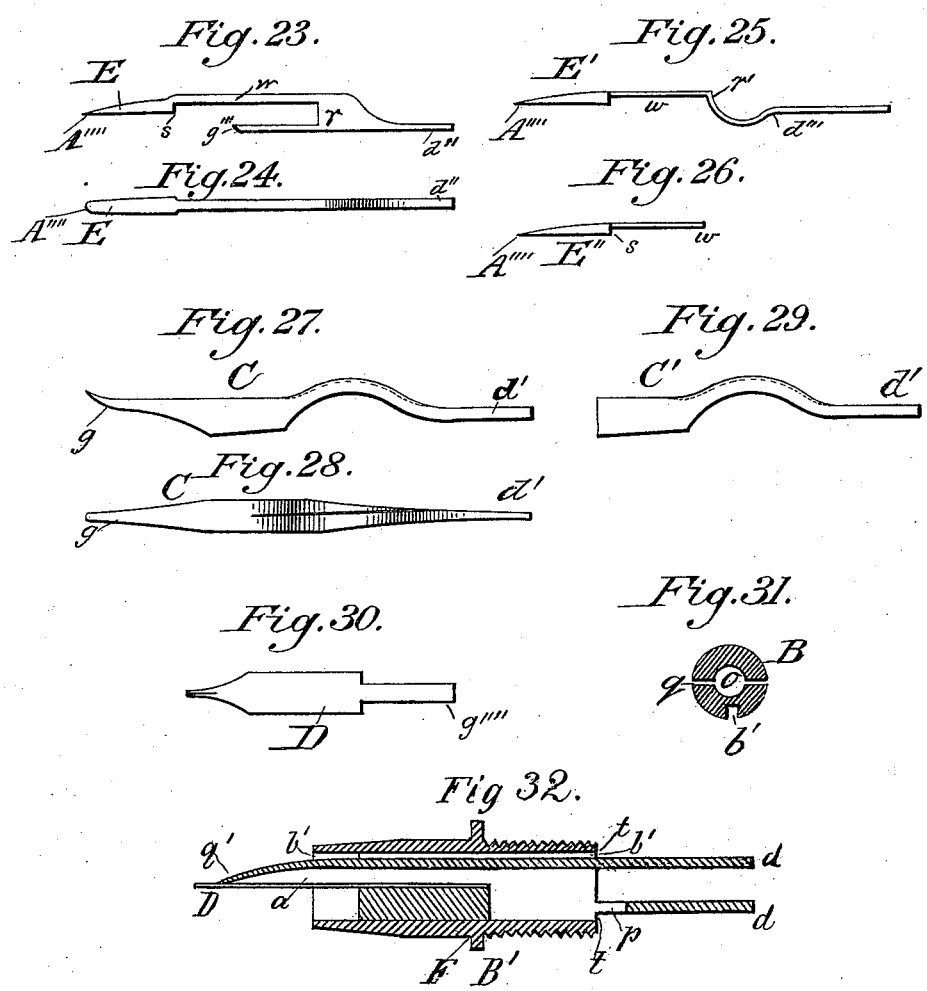

UNITED STATES PATENT OFFICE.

LAFOREST A. SHATTUCK, OF BLOOMSBURG, PENNSYLVANIA.

FOUNTAIN-PEN.

SPECIFICATION forming part of Letters Patent No. 402,864, dated May 7, 1889.

Application filed April 6, 1888. Serial No. 269,846. (No model.)

*To all whom it may concern:*

Be it known that I, LAFOREST A. SHATTUCK, a citizen of the United States, residing at Bloomsburg, in the county of Columbia and State of Pennsylvania, have invented certain new and useful Improvements in Fountain-Pens; and I do hereby declare the following to be a full, clear, and exact description of the invention, such as will enable others skilled in the art to which it appertains to make and use the same.

My invention relates to improvements in fountain-pens whereby I provide certain novel devices for carrying out the following purposes and advantages, to wit: first, simplicity and cheapness of construction; second, perfect action in making either a heavy or light stroke; third, perfect adjustment of the air-pressure to the capillary attraction, so as to avoid blotting or skipping; fourth, complete immunity from soiling the fingers while in the act of writing; fifth, manner of construction admitting of ready separation of its parts for purposes of cleaning, the substitution of different pens, or the change at will from a single to a double feed pen, and vice versa.

With these objects in view I employ a device which I term an "adjustable key," and which is so constructed as to serve the fourfold purpose of a "key" to complete the lock or support for the pen, a "removable ink-stopper," an "air-vent," and an "adaptable under-feed bar," which can be instantly adjusted to transform a double-feed pen into a single upper-feed and reconvert to a double feed to accommodate different grades of ink and styles of writing. I regard this feature of my invention of the highest importance, since it is the simplest device for supporting the pen, permitting the use of a pen either straight or tapering, curved, or flat at the shank, and admitting of an almost instantaneous change. Perhaps not the least important feature of this adjustable key, and to which I desire to call special attention, is the avoiding of the necessity for a separable nozzle. Since one of the primary objects of separable nozzles is for filling the reservoir, I can avoid the expense of this, as the ready removal of my adjustable key and ink-stopper opens the mouth through which the reservoir may be filled by the usual implements, and, further, when the removable stopper is used in combination with a separable nozzle the necessity for removing the nozzle for the purposes of filling is also avoided.

Another object which may be gained by my invention is the instantaneous transforming of my double-feed fountain-pen into a fountain-quill, or, in other words, into a device which does the work of a goose-quill. This is accomplished by slipping out the pen and adjusting the under-feed bar to a bifurcated transmitter. I wish also to direct particular attention to the device which I shall hereinafter refer to as the "combination-lock." This may or may not be used in combination with the adjustable key, and may be employed in either the separable or integral nozzle, as will more fully appear. I desire further to call attention to my novel devices for conducting the ink from the reservoir and transmitting it to the point of the pen.

Having reference to the drawings hereto attached, I will now proceed to describe in detail my improved fountain-pen.

Figure 1 is a central longitudinal sectional view of my ink-supply reservoir, separable nozzle, and pen-shielding cap. Fig. 2 is a central longitudinal sectional view of my separable nozzle, with certain forms of my devices in position, in which I employ the adjustable key C and the lock B'' in combination, the superior transmitter E'' being separable and with its shank $w$ fitting in the groove $l$ of the lock, which securely locks it in position. Fig. 3 is a cross-section of Fig. 2 on the line $x$ $x$. Fig. 4 is a central longitudinal sectional view of a modification of Fig. 2, in which I dispense with the lock B'' and insert the shank $w$ of the transmitter E'' into a perforation or mortise sunk in the end of the upper lip of the nozzle or nozzle end of the reservoir. Fig. 5 is a cross-section of Fig. 4 on the line $y$ $y$. Fig. 6 is another modification of Fig. 2, in which I dispense with both the combination-lock B'' and superior transmitter E'', and employ the adjustable key C in combination with a pen and a separable nozzle for a single under-feed pen. Fig. 7 is a transverse section of Fig. 6 on the line $z$ $z$. Fig. 8 is another modification of Fig. 2, in which I dispense with the adjustable key C and employ a combination-lock, B''', in combination with a separable nozzle, F, a pen, transmitter E'', and a helicoidal conductor, d'''', for a single upper-feed pen. Fig. 9 shows a transverse section of Fig. 8 on line e e. Fig. 10 is another modification of Fig. 2, in which I dispense with the separable nozzle F, the combination-lock B'', and the separable transmitter E'', and employ the adjustable key C in combination with a pen and the reservoir A A' for a double-feed pen, the upper wall of the reservoir being cut away to a thin point, A'', for the superior ink-transmitter, and thus constructing complete a double-feed pen out of but three separable parts. Fig. 11 is a modification of Fig. 2, wherein I employ the separable nozzle F'', the upper lip of which is elongated to a pen-shaped point, A''', for the superior transmitter, which is bifurcated like the nibs of a pen, the adjustable key C and the pen being the same as in Fig. 10. Fig. 12 is a plan view of Fig. 11, showing the transmitter over the pen. Fig. 13 is a modification of Fig. 2, showing the separable nozzle F, the lock B'', the separable transmitter E, and a pen in the combination of a single upper-feed pen. Fig. 14 shows a plan or top view of Fig. 13. Fig. 15 is a modification of Fig. 13, differing only by using a modification of the superior separable transmitter, as E', and a pen having a long shank, g''''. Fig. 16 is a plan view of the combination-lock. Fig. 17 is a side view of the same. Figs. 18, 19, 20, and 22 show modifications in the method of constructing the lock. Fig. 21 is a transverse section of Fig. 19 on the line v v, showing grooves b and b'. Fig. 23 is a side elevation of my superior separable transmitter. Fig. 24 shows a plan of the same. Figs. 25 and 26 are detail views of the modifications of this transmitter, as shown in position in Figs. 2, 4, 8, 15, and 20. Fig. 27 is a side elevation of my adjustable key. Fig. 28 shows a plan of the same. Fig. 29 is a modification in form of the adjustable key. Fig. 30 is a top view of the form of the pen in which I provide a long shank for an intermediary ink-transmitter, as shown in Fig. 15. Fig. 31 is a cross-sectional view of the combination-lock shown in Fig. 19 and as when said lock is not constructed with the groove b. Fig. 32 is a horizontal section showing a different arrangement and adjustment of the lock.

A represents the reservoir, which may be made in any shape, but preferably round. It is made of hard rubber, celluloid, or any light and suitable material. It is a hollow tube closed at one end and open at the other, and is supplied with a cap, G, which fits either end. Its open end or mouth is supplied with either an internal or external screw-thread to receive a separable nozzle; or for purposes of economy said open mouth of the reservoir may be used as an integral nozzle, like A' in Fig. 10, my removable ink-stopper or adjustable key, as C, obviating the necessity for extra expense and complication of a separable nozzle, as F', Fig. 2. The bore of the reservoir may be of equal diameter for its entire length, or may be enlarged at its lower end to receive the combination-lock and helicoidal conductor, as d'''', Fig. 8. The lower lip of the mouth of the nozzle or nozzle end of the reservoir may be cut away or made shorter than the upper—that is, made slightly wedge-shaped, as in Figs. 2 and 4—to facilitate the use of an adjustable key, as C, and to form a finger-shield; or the upper lip may be still longer and cut down to a pen-shaped point to form the superior ink-transmitter, as A'' in Fig. 10. In these forms of superior ink-transmitter made integrally with either the reservoir or the nozzle I cut it away to a thin point slightly curved down to bear upon the pen at its point and edges, and I slit it up for a short distance, so as to form nibs like the pen to give it greater flexibility and for purposes of use as a fountain-quill. In the combination for a single upper-feed pen (represented in Fig. 8) the lower lip of the nozzle remains intact, or of the same length as the upper one, as in this form I avoid the necessity for and expense of an adjustable key; but in the double-feed combination represented in Fig. 4 I cut away the lower lip, as I employ the adjustable key, as C, and dispense with the combination-lock, as B, by inserting the superior ink-transmitter E'' into the upper lip of the nozzle in the manner shown. The upper ink-transmitter, as A'' in Fig. 10 and A''' in Fig. 11, is sufficiently broad at the base to cover or nearly cover the pen, so as to form a finger-shield to prevent soiling the fingers. It is curved in cross-section, so that when its edges are bearing against the pen a crescent-shaped channel or egress for the ink to be transmitted to the back of the point of the pen is formed; but in Figs. 2 and 4, in which a short pen may be used, the ink-transmitter E'' is of the form shown, separable, quite narrow, and flexible, and may bear upon the pen only at the point, or may be made in the shape and to bear upon the pen like either the transmitter in Figs. 10 or 11.

B is the combination-lock, which may be made of hard rubber or any light incorrodible material. This important device accomplishes the manifold purpose of a "reducer," an "ink-conductor," an "upper-feed bar," a "separable transmitter-lock," and a "pen-lock," thus affording the most simple arrangement for securing or holding the pen, obviating the necessity for grooves in the nozzle and more complicated pen-holding devices. Moreover, this simple manner of supporting the pen enables one to readily and quickly remove the pen when it is desired to substitute a different one.

The central body of the lock B, Figs. 16, 17, and 31, which is the reducer, is a hollow tube made to fit snugly in the nozzle F, Fig. 1, or nozzle end A' of the reservoir, Fig. 10, and is held in position by friction. Through the opening or perforation o of the tube, which communicates with the reservoir, the pen D is inserted, and thereby divides the tube into two parts or spaces, the upper crescentic space being the beginning of the upper-feed channel a, while the other space, b, provides an opening for the adjustable key C, or for an air-vent. The forward end of the body or reducer portion of the lock B may be shaped in different ways, as illustrated, to answer the object sought, or to conform to the shape of the end of the nozzle. Its upper lip may be of the same length as the lower lip, or it may be longer and tapered to a thin point, $g''$, as in Fig. 17, which serves the double purpose of a finger-shield and an ink-transmitter, and when the transmitter is so formed it is concave on its under or pen surface in cross-section, thus continuing the crescentic channel a above the pen down to the nibs. The outer edges and point of this form of the superior ink-transmitter are intended to bear upon the top of the pen; but its pen-surface may be nearly flat, in which case it is slightly raised from the pen D, except at its point which comes in contact with said pen near the nibs.

The inner end of the combination-lock (shown in Figs. 16 and 17) is provided with parallel bars $d\ d$, integral with and extending from the central part of its lateral walls, which serve the purpose of ink-conductors, reaching into the reservoir. These bars are cut away quite narrow from above and beneath, leaving two shoulders, $t\ t$. This form of ink-conductors I consider of great advantage, as two bars are more effectual when thus arranged than would be a greater or less number thereof. The bars are separated from each other by a space nearly or quite equal to or greater than the width of the central perforation, and the surfaces facing each other may be either grooved or flat. These conducting-bars $d\ d$ may be arranged on the upper and lower side wall of the lock, as shown in Fig. 32; but I prefer to have them arranged laterally, as shown in Figs. 16, 17, 18, and 19. Across the forward end of the body or reducer, just below the base of the transmitter-point $g''$, I sink a transverse slot, $q$, in which the heel of the pen binds firmly. On the top side of the inner end of the reducer or body of the lock, midway between the base of the conductors $d\ d$, I sink a longitudinal slot, $p$, Fig. 16, down to the central perforation, $o$, and carry it forward to the upper end of the slot $q$. By this means the ink which is drawn by the conductors $d\ d$ continues by the same capillary attraction between the lateral walls of the slot $p$ to the heel of the pen, and from thence by capillary attraction between the pen and the inner upper surface of the reducer and lower surface of the transmitter to the point of the pen, the expended ink being compensated for by the air which enters the space $b$ when the lock is used, or through the air-vent $c$ when an adjustable key is used. The slot $p$ is not as wide as the space separating the conducting-bars $d\ d$, and should the conductors be arranged above and below instead of laterally this capillary slot $p$ should be extended from the pen-slot $q$ to a little beyond the shoulders $t\ t$, so as to clear the inner end of the nozzle, as shown in Fig. 32.

B' in Figs. 18 and 19 shows a modification of the combination-lock differing from that shown in Fig. 16 only by having a smaller perforation, $o$, through it, which extends as much below as above the slot $q$, and by having its upper lip shorter than the lower one, and the central portion of its under instead of its upper lip constructed in the form of a narrow point, $g'$, for an under-feed bar to take the place of the feed-bar $g$ of the adjustable key shown in Fig. 2. This under-feed bar $g'$ is concavo-convex in cross-section and bears upon the under surface of the pen at its converging sides and point. It is further varied by making a groove, $b'$, on the under external surface of the body or reducer portion for an air-vent, as shown in Fig. 21. I also vary it by making a groove in its upper surface, like $l$, as shown in Fig. 20, for a separable transmitter, E'', or I may employ it for a single under feed by making the perforation $o$ through it still smaller and placing it entirely below the pen and dispensing with the groove $l$, as in Fig. 19, and when so formed it may be reversed in the nozzle, bringing the feed-bar $g'$ and air-vent $b'$ above the pen and ink-channel for an upper-feed pen. Instead of arranging the air-vent groove $b'$ on the upper or lower periphery of the lock, it may be arranged on either or both sides of the lock in line with the pen-slot $q$.

B'' in Figs. 20 and 22 is another modification of the combination-lock, in which I cut away the lateral conductors and also the transmitter, and form a groove, $l$, in its upper surface for the shank $w$ of the separable transmitter E''. It may be provided with slots $q$ and $p$, the same as in those heretofore described.

B''' in Fig. 9 is a cross-sectional view of another modification of the combination-lock, taken at the line $e\ e$ of Fig. 8. In this form I cut away the lower portion of the reducer to form the space $b''$ for an air-vent, and a short distance above its under side I cut the slot $q$, leaving a short thin under lip, $n$, bearing close to the under surface of the pen, and on a line with the upper surface of the pen I make the central longitudinal perforation, $o$, communicating with the ink-chamber and forming the ink-channel. I may extend this perforation as much below as above the pen, and construct the under lip, $n$, with a tapered point for an under-feed bar, like $g'$ in Fig. 19, and I may employ with this form of reducer either form of the transmitters or conductors employed in the other modifications. In this modification of the combination-lock, where the longitudinal perforation extends as much below as above the slot $q$, I may use a grooved pen, as the depression or groove on the pen-shank will fit in the perforation $o$ and leave no space between the pen and the under lip.

The central body of either form of my combination-lock may or may not be the full length of the nozzle. Its forward end may be flush with the open mouth of the nozzle, as in Figs. 2, 8, 13, and 15, or it may be inserted into the reservoir end of the nozzle far enough to be held in position by friction, as shown in Fig. 32.

C is the adjustable key, which may be so constructed as to serve the manifold purpose of a key to complete the pen-lock, an adjustable under-feed bar, a movable ink-stopper, an air-vent, and an ink-conductor. This combination implement is made to fit into the space $b$ beneath the pen in the nozzle, as shown in Figs. 2, 4, 6, and 11, or in nozzle end of the reservoir, as shown in Fig. 10. It is made preferably of hard rubber and in shape somewhat like an Indian's bow, having a central body with two arms. The central body, which forms the ink-stopper and contains within it a central longitudinal perforation or air-vent, $c$, is made in shape to conform to the contour of the space $b$ in the nozzle beneath the pen, and may have a longitudinal groove on its pen-surface for an inferior ink-channel, or it may be made slightly narrower than the space $b$, forming two lateral ink-channels, $n'$ $n'$, when in position somewhat crescentic in shape, as shown in Fig. 3; or, instead of being narrowed to form channels, it may have lateral grooves $i\ i$, as shown in Figs. 5 and 7, for the lateral channels, or it may have both pen-surface and lateral ink-channels. This central body or ink-stopper section is somewhat tapering from front to rear like any stopper, so as to fit loosely in the inferior space, $b$, when an under feed is desired, or quite snugly when it is desired to withdraw the under feed from use in the change from a double to a single upper feed to accommodate different grades of ink or styles of writing. The longitudinal perforation or air-vent $c$ through the center of the ink-stopper section may be contracted from front to rear or rear to front, or may be of the same diameter throughout. Through this air-vent the air enters to compensate for expended ink. When this ink-stopper section of the adjustable key is adjusted loosely, the ink passes down around it or through its grooves or ink-channels by capillary attraction to supply the under feed; but when pushed up snugly this capillary action is sufficiently shut off to transfer to a single upper feed, as it is readily adjusted by the use of the point of a knife. The outer or under feed bar, $g$, is somewhat tapering and may be concavo-convex in cross-section, or it may be flat or oval externally and flat on its pen-surface, which may or may not have a longitudinal groove-extension. It is slightly curved upward, so as to have a bearing at its point when sprung into position against the under side of the nibs of the pen, and leaves a very slight space between it and the pen from its bearing-point on the nibs of the pen to allow for the accumulation of ink for instantaneous use; or it may bear upon the pen throughout by making the groove in its pen-surface to form the inferior ink-channel. The inner arm, $d'$, serves the dual purpose of a spring-lever and an ink-conductor. Being curved upward beyond its upper peripheral plane, it binds firmly, when sprung into position, against the walls of the nozzle or nozzle-ends of the reservoir and holds the key in position by friction. It also acts as a lever to pry the pen against its upper support, the lower walls of the nozzle serving as a fulcrum. This conductor brings the ink down to the heel of the pen, where it continues by capillary attraction through both upper and under ink-channels.

Fig. 29 shows a modification of my adjustable key, differing only by having its outer arm, $g$, cut off. Its only advantage lies in its requiring less material to manufacture it, and it may be used either with or without the combination-lock for a single upper-feed combination.

D is the pen, preferably made of gold, though any ordinary pen may be used if of proper size and shape. It may have a straight shank or be slightly tapering toward the heel and be either flat or concavo-convex in cross-section, or it may have a central longitudinal groove or depression extending from the heel to near the nibs in its upper surface to form the lower wall of the upper ink-channel when covered by the superior transmitter. It may have a long narrow shank, $g''''$, as shown in Figs. 15 and 30, to supply the place of the intermediary transmitter, $g'''$, as shown in Figs. 13 and 23. This shank may be made long enough to extend clear through the nozzle to serve the place of an ink-conductor in connection with the combination-lock, and may be made of the same material and integral with the pen, or it may be made of any cheap metal soldered or riveted onto the heel of the pen and coated with some incorrodible substance, or it may be made of hard rubber or celluloid riveted onto the pen. The pen is made of suitable width for its lateral edges to bear against the walls of the nozzle or reservoir, and is held in position by friction in the slot $q$ of the lock, or by the walls of the nozzle aided by the adjustable key.

E, Figs. 13 and 23, represents my preferred form of superior ink-transmitter when used with a separable nozzle in a single upper-feed pen, as it is employed in union with the least expensive form of the combination-lock and is much more cheaply repaired in case of fracture. It is preferably made of the same material as the lock, though gold or any incorrodible material may be used. Its shank $w$ is made to fit closely in the groove $l$ in the upper surface of the lock B, so that when in position it binds firmly between the lock and the nozzle and is securely locked. Its outer or exposed end, A''''', which is the external transmitter portion, may be narrow, flat, and flexible, or it may be sufficiently broad to form a finger-shield. It is raised slightly from the pen, except near its point, which rests on the pen at the nibs. It may also have a groove on its under surface, or it may be concavo-convex in cross-section and rest upon the pen at its edges and point. At its point of union with the shank a shoulder, $s$, is formed, sufficient to bring its ink-surface down on the same plane as the upper surface of the superior ink-channel, so as to maintain an unbroken capillary surface from the ink-chamber to the point of the pen. Its inner end, at its point of union with the shank $w$, is brought down to about the central axis of the lock by a shoulder, $r$, somewhat deeper than at the forward end, and this shoulder is provided with two arms, one extending through the nozzle to the reservoir for an ink-conductor, $d''$, and the other an intermediary transmitter or tongue, $g'''$, reaching forward within the lock to about the heel of the pen. The ink is drawn down by the conductor $d''$ and is taken up and carried along by the intermediary transmitter, $r$, to the heel of the pen D, whence it continues by capillary attraction between the back of the pen, the lock B, and the superior transmitter-point A''''' to the point of the pen.

The air enters through a space, $b$, left open for an air-vent beneath the pen to compensate for expended ink.

E' in Fig. 25 shows a modification of my superior transmitter. Its outer end or transmitter portion, A'''', and the shank $w$ are the same as in those heretofore described. Its inner end or shoulder, $r'$, is bent down at the inner end of the lock, then up by a gradual curve and into the reservoir, very much in shape like the figure "5." This form is employed when using a pen having a long shank, as $g''''$, Fig. 15, reaching back close enough to the base of the conductor to attract the ink.

E'' in Fig. 26 shows another modification of the superior separable transmitter, and differs from those heretofore described by the conductors and tongue being cut off, as it is used in combination either with the adjustable key or the lock which are provided with conductors. Its shank $w$ fits in the groove $l$ of the lock, as shown, or it may be inserted in a perforation or mortise sunk in the end of the upper lip of the nozzle or nozzle end of the reservoir, as shown in Fig. 4. In this form the ink is drawn down by the conductor to the heel of the pen, where it divides into two currents, one over the back of the pen between it and the superior transmitter E'' and the other beneath the pen down around the body of the adjustable key C, both by capillary attraction, and is compensated for by the air entering the central air-vent, $c$, through the adjustable key.

F is the separable nozzle, made of the same material as the reservoir, and is provided at one end with an external screw-thread to fit into the open end of the reservoir, as shown in position in Fig. 1.

F' in Figs. 2, 4, and 6 shows a modification of my separable nozzle, differing only therefrom by having its upper lip longer than the under lip and forming a finger-shield, this being effected by cutting away a portion of the under lip to form a somewhat like a wedge if viewed laterally.

F'', Fig. 11, is another modification of the nozzle, differing from Fig. 2 only in having its upper lip much longer and narrowed to a thin point, which is slit up to form nibs like a pen, forming the superior transmitter-point A'''. Instead of employing either of these forms of nozzle I may avoid the expense of a separable nozzle, as my adjustable key enables me to use the open mouth of the reservoir for all purposes for which a separable nozzle is employed, as shown in Fig. 10. I may make use of the same combinations of keys, locks, conductors, and transmitters, as illustrated, with the separable nozzle.

G is the cap to protect the pen. It fits either end of the reservoir, and is made of the same material as the reservoir.

In Fig. 8, $d''''$ is a modification of the conductor. It may be made integral with the lock and of the same material, or it may be separable, in which case I may make it of wire, either of gold or some cheap wire coated with any incorrodible material. As will be seen, it is of helicoidal form, tapering or straight, and, if separable, with one end fitting snugly in the inner end of the lock; or it may rest in the nozzle against shoulders formed in the upper end of the nozzle, as shown in Fig. 8; or it may be held in position by friction. This helicoidal conductor is shown with one of its ends straight and extended into the reservoir and its other or lower end formed in the same way and extended along the central longitudinal axis of the lock to the heel of the pen. This conductor draws the ink down to the heel of the pen, whence it passes over the back of the pen by capillary attraction between it, the upper wall of the lock, and the ink surface of the superior transmitter, the same as in the other modifications. Instead of making it short, as in Fig. 8, it may extend the full length of the reservoir, to facilitate the process of filling the reservoir with ink.

Having thus described my invention, I claim—

1. In a fountain-pen, the combination, with the tubular ink-reservoir A, of the nozzle F, the combination-lock B, fitted therein and having the two parallel ink-conductors $d\ d$, the shoulders $t\ t$, the central ink-flowing medium or perforation $o$, the capillary ink-slot $p$, the integral superior transmitter or long upper lip, $g^2$, in contact at its converging sides and point with the back of the pen, the slot $q$, carrying a pen, D, which divides the central longitudinal perforation, o, into an upper space, a, for the superior ink-channel over the pen, and a lower space, b, beneath the pen for an air-vent communicating with the reservoir, substantially as and for the purpose described.

2. In a fountain-pen, the combination, with an ink-reservoir, of a nozzle, F', having its under lip diagonally incised, so as to form the long finger-shielding upper lip, the combination-lock B'', fitted in the nozzle, having the slot q, in which is fitted the pen D, and a groove, l, into which the shank of the separable transmitter E'' is fitted and locked between it and the upper wall of the nozzle, with its free end, at sides and point, in contact with the pen and a space beneath the pen, with the adjustable key C, having a central body or movable ink-stopper fitted therein, and serving for purposes of adjustment, and filling the reservoir without removing the nozzle, said key also having a central longitudinal perforation or air-vent, lateral ink-channels, a curved ink-conducting spring, and lever-acting and adaptable under-feed bar g, which can be adjusted to different grades of ink or so as to transform a double-feed to a single upper-feed pen, substantially as and for the purpose described.

3. In a fountain-pen, the combination, with the ink-reservoir, of the nozzle F, the combination-lock B'', fitted therein, having the slot q across the axis of the central perforation, o, a pen, D, fitted therein, a groove, l, in the upper surface of the lock for the shank w of the separable transmitter E' to be locked therein, the said transmitter having a free point in contact with the pen, and an ink-conductor extending into the reservoir, substantially as and for the purpose described.

4. In a fountain-pen, the combination, with the reservoir, of a nozzle having a long upper lip containing a longitudinal perforation or mortise and having the shank w of the transmitter E'' fitted therein, while said transmitter is in contact at its free point with the pen D, which is held by friction in the nozzle and supported by the adjustable key C beneath, substantially as and for the purpose described.

5. In a fountain-pen, the combination, with the ink-reservoir, of a nozzle having its under lip slightly shortened and holding by friction a pen, D, supported by the adjustable key beneath, substantially as and for the purpose described.

6. In a fountain-pen, the combination, with the ink-reservoir, of a separable nozzle, F, the combination-lock B'', fitted therein, having the slot q across the end of its central perforation, into which a pen, D, is fitted, a groove, l, in the upper surface, in which is locked the shank of the separable transmitter E, which has its free point in contact with the pen, and an inner ink-conductor, substantially as described.

7. In a fountain-pen, the combination of a separable nozzle, F'', carrying a pen, D, which is supported by the adjustable key C, the upper side of the nozzle being longer than the under side and narrowed to a point, A''', forming the finger-shield and superior transmitter, which is slit or divided at its point to form nibs like a pen for quill-writing and has its under surface describing the same degree of concavity as the inner surface of the nozzle, so as to form the upper wall of the crescentic-channel extension of the ink-channel over the pen and in contact at its edges and free point with the pen, substantially as described.

8. In a fountain-pen, the combination, with the ink-supply reservoir, of the separable nozzle F, the combination-lock B'', fitted therein and having the slot q, holding a pen, D, and the space b below the pen for an air-vent, and provided on its upper surface with the longitudinal groove l, into which is locked the superior transmitter E, which has its free point in contact with the pen and is provided with an ink-conductor, d'', and an intermediary transmitter, g''', substantially as described.

9. In a fountain-pen, the combination, with an ink-reservoir, of the separable nozzle F, the combination-lock B'', fitted therein, its outer end having the slot q, the pen D, with the long narrow shank-extension inserted therein, a curved ink-conductor, the groove l, holding the shank w of the superior transmitter E', while said transmitter is in contact at its free point with the pen, substantially as and for the purpose described.

10. In a fountain-pen, the combination, with the ink-reservoir, of a nozzle, the combination-lock B, fitted therein, having the transverse slot q, holding a pen, D, supported by an adjustable key, C, beneath, and having the superior transmitter g'' integral with the upper lip of the lock and its edges and free point in contact with the pen, substantially as and for the purpose described.

11. In a fountain-pen, the combination, with the ink-reservoir, of a nozzle, the combination-lock fitted therein and having the slot q, holding the pen D, beneath which is a space for the air-vent and above the pen the upper ink-channel, the superior transmitter E'', with its shank locked in the longitudinal groove l and its free point in contact with the pen, and the separable ink-conductor, substantially as and for the purpose described.

12. In a fountain-pen, the combination, with the ink-reservoir, of a separable nozzle, F, the combination-lock B', fitted therein and having the parallel ink-conductors d d, the upper ink-slot, p, the lower surface-groove, b', for an air-vent, the transverse slot q, in which the pen D binds and lies across the upper side of the longitudinal central perforation, and under-feed bar g', in contact at its converging sides and point with the under surface of the pen, substantially as and for the purpose described.

13. In a fountain-pen, the combination, with the ink-reservoir, of a separable nozzle, the combination-lock B', inserted therein and having the parallel ink-conductors d d, the capillary slot p, the transverse slot q across the central axis of the longitudinal perforation, and in which a pen, D, binds, the groove or air-vent b' on its under surface, the under-feed bar g', in contact with the pen at its sides and point, and the superior transmitter E'', inserted into and locked in the groove l, with its free outer end in contact with the pen, substantially as and for the purpose described.

14. In a fountain-pen, the combination, with the ink-reservoir, of a separable nozzle, the combination-lock B''', inserted therein and having its under portion cut away to form an air-vent, b'', the slot q, in which a pen is held on the lower side of the central perforation, a groove, l, in its upper surface, and the superior separable transmitter fitted therein and having its free end in contact at its point with the pen, substantially as and for the purpose described.

15. In a fountain-pen, the combination, with the ink-reservoir, of a separable nozzle, the combination-lock fitted therein and having the slot q, carrying pen D, which divides the forward end of the lock through the axis of the central perforation into an upper and lower lip, the upper lip longer than the lower one and narrowed to a point, and forming the superior transmitter, which is flat on its under surface and convex or flat on its upper surface and in contact at its point with the pen, the pen being connected with the ink-supply by the ink-conductor, and an air-vent being beneath the pen, substantially as described.

16. A fountain-pen comprising, in combination, but three main separable parts, to wit: an ink-reservoir, A, having a nozzle and superior ink-transmitter, an adjustable key having an adaptable under-feed bar, ink-stopper, ink-conductor, and an air-vent, and a pen, substantially as and for the purpose described.

17. In a fountain-pen, the combination, with the ink-reservoir A, of a nozzle, F, the combination-lock B', fitted therein and having a long feeding portion, g', arranged above and in contact at its sides and point with the back of a pen, the two parallel ink-conductors d d, the capillary ink-slot p, the shoulders t t, the central perforation or ink-flowing medium, o, the slot q, holding the pen D, and the surface air-vent groove b', arranged above the ink-flowing medium and pen, substantially as described.

18. In a fountain-pen, the combination, with an ink-reservoir, of a separable nozzle, the combination-lock B', fitted in the reservoir end of the nozzle and locking in the groove l, the superior separable ink-transmitter E'', in contact at its point with a pen, D, which is held in the nozzle by friction, and an adjustable key having an adjustable under-feed bar and a movable ink-stopper section with a central perforation, substantially as described.

19. A fountain-pen having an ink-conductor in the form of two parallel bars arranged laterally, as d d, and extending from shoulders t t, substantially as and for the purpose described.

20. The fountain-pen having the ink-conducting medium in the form of two parallel bars arranged horizontally, as d d, and constructed integrally with the body of the combination-lock, substantially as and for the purpose described.

21. A fountain-pen having the parallel bars d d, arranged horizontally, and the ink-slot p, extending from the pen-slot to and through a portion of one of the ink-conducting bars, substantially as and for the purpose described.

22. A fountain-pen having a tubular feeder constructed with a locking-groove along a portion of its length and across its ink-channel and an air-vent groove in its periphery, substantially as described.

23. A fountain-pen having a longitudinally-sliding combined key and feed-bar, as C, the same being adjustable inwardly and outwardly for different kinds of writing and for use alone or with an upper-feed bar, substantially as described.

24. In a fountain-pen, the combination, with the ink-reservoir A, formed with an integral nozzle, A' A'', of a pen, D, fitted and held in position by friction and supported beneath by an adjustable key, C, and borne upon at top by the tapered pointed wall portion $A^2$ of the integral nozzle A' in such manner that said wall portion, while forming a finger-shield above the pen and serving as an ink-transmitter by coming in contact at its converging sides and point with the pen, also serves for forming the walled extension of the ink-channel over the back of the pen, substantially as and for the purpose described.

25. In a fountain-pen, the combination, with the reservoir, of the nozzle, the combination-lock fitted therein and provided with the peripheral air-vent groove b', arranged laterally, the parallel ink-conductors d d, arranged horizontally, and the superior ink-transmitter in contact at its sides and point with a pen, D, substantially as described.

26. In a fountain-pen, the pen D, formed with a reduced integral extension from its heel for conducting ink from the ink-supply to the pen-point, substantially as described.

In testimony whereof I hereunto affix my signature in presence of two witnesses.

LAFOREST A. SHATTUCK.

Witnesses:
 J. P. THEODORE LANG,
 E. T. FENWICK.